United States Patent Office 3,100,361
Patented Aug. 13, 1963

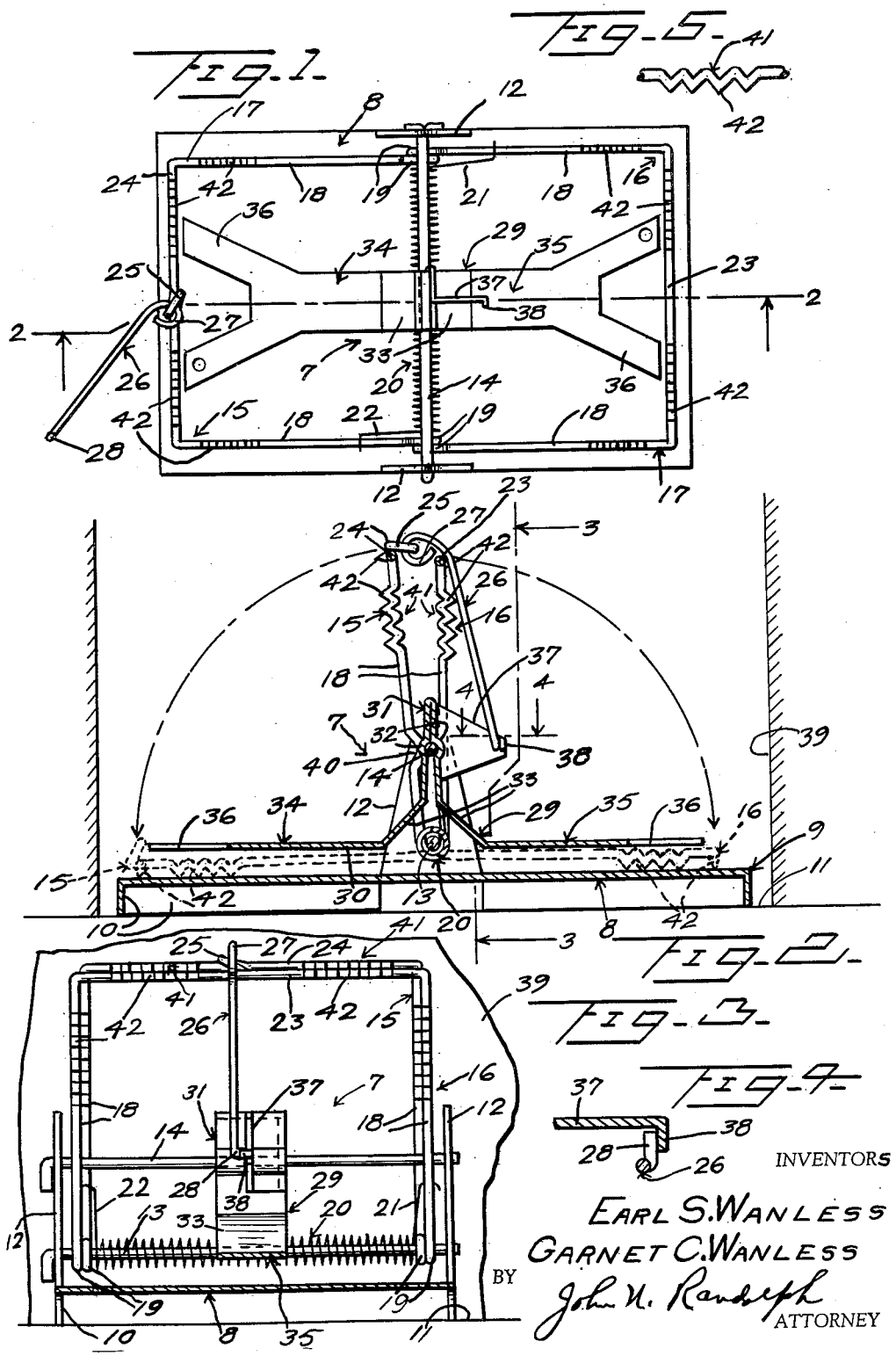

3,100,361
ANIMAL TRAP
Earl S. Wanless and Garnet C. Wanless, both of 247 5th Ave., Viroqua, Wis.
Filed Oct. 30, 1961, Ser. No. 148,447
2 Claims. (Cl. 43—81)

This invention relates to a novel animal trap of simple construction primarily adapted for trapping small rodents such as rats and mice.

A primary object of the invention is to provide a double-jawed trap having a novel pan, extending to near the end of the base of the trap at both ends, and a pan release, by means of which the trap may be sprung by an animal passing in either direction over either end of the trap base, for trapping or catching the animal between one of the trap jaws and the end of the base over which the animal is moving.

Another object of the invention is to provide a trap which will not frighten wary rodents due to the fact that a rodent does not have to pass longitudinally of the trap through the upright set jaws but may pass on either side of the jaws over the trap base and in so doing effect release of the trap.

Still another object of the invention is to provide a trap which is readily adapted to be mounted crosswise in a passageway frequented by rodents, crosswise of an end of such passageway, or against and crosswise of a wall bounding an area affording a protected path of travel for rodents and in which the trap can effectively function to trap rodents moving in either direction.

Still a further object of the invention is to provide a trap which is extremely sensitive so that release of the jaws is effected when either end of the pan is touched or otherwise disturbed.

Still a further object of the invention is to provide a trap the pan of which is suspended within the upright set jaws at a considerable elevation above the trap base enabling a relatively short trigger to be utilized and which will not engage an animal to hamper release of the jaws after the trigger has been disengaged by a detent part of the pan.

Still another object of the invention is to provide a double-jaw type trap having novel means to prevent swaying of the set jaws to insure release of the trigger when the pan is rocked in either direction.

Various other objects and advantages of the invention will hereinafter become more fully apparent from the following description of the drawing, illustrating a presently preferred embodiment thereof, and wherein:

FIGURE 1 is a top plan view showing the animal trap in a released position;

FIGURE 2 is a longitudinal sectional view of the trap taken substantially along the line 2—2 of FIGURE 1, on a somewhat enlarged scale and showing the trap in a set position;

FIGURE 3 is a cross sectional view of the trap taken substantially along the line 3—3 of FIGURE 2;

FIGURE 4 is an enlarged fragmentary horizontal sectional view of a part of the trap, taken substantially along a plane as indicated by the line 4—4 of FIGURE 2, and FIGURE 5 is an enlarged fragmentary elevational view of a part of one of the trap jaws.

Referring more specifically to the drawing, the animal trap in its entirety is designated generally 7 and includes a substantially flat base, designated generally 8, and is preferably formed from a single sheet of a relatively heavy gauge metal 9 having downturned side edge and end portions forming supporting flanges 10 which are adapted to rest on a floor or other supporting surface 11. The base 8 is elongated and is provided intermediate of its ends with corresponding upstanding ears 12, which form parts of the metal piece 9, and which extend upwardly from side edges of the base 8.

A lower shaft or axle 13 extends across the base 8 through the ears 12 and is supported by said ears above and spaced from the base 8. An upper axle 14 extends between and through the ears 12, near their upper ends, and is disposed substantially above the axle 13.

A pair of jaws 15 and 16 is swingably mounted on the lower axle 13. Each jaw is formed from a single strand of relatively heavy gauge wire 17 and is of substantially U-shape. Each jaw includes two substantially parallel legs 18 formed by end portions of the wire strands 17 and which legs 18 have eyes 19 constituting the terminals of the strands 17 and which turnably engage the lower shaft or axle 13 between the ears 12. One eye 19 of each of the jaws 15 and 16 is located adjacent each ear 12. The legs 18 of the jaw 16 are spaced apart a distance slightly greater than the spacing between the legs 18 of the jaw 15, so that the eyes 19 of the jaw 15 are disposed between the eyes 19 of the jaw 16. A spiral spring 20 is disposed loosely on the lower shaft 13 between the eyes 19 of the jaw 15 and has one terminal 21 extending longitudinally of the trap from one end of said spring toward one end of the base 8 and which bears upon the upper or inner side of one leg 18 of the jaw 16, and an opposite terminal 22 which extends in the opposite direction from the other end of said spring and which bears upon the upper or inner side of a leg 18 of the jaw 15. The jaw 16 has an intermediate portion 23 which extends between the outer ends of the legs 18 thereof and which constitutes the intermediate portion of the strand 17 forming said jaw. The jaw 15 has an intermediate portion 24 extending between the outer ends of the legs 18 thereof and forming the intermediate portion of the strand 17 of said jaw 15. The jaw portion 24 has a loop 25 located intermediate of its ends and which projects from the upper or inner side of said jaw 15.

A rigid strand forming a trigger 26 has an eye 27 at one end thereof which interengages with the loop 25 for loosely connecting the trigger 26 swingably to the jaw 15. The other, free end of the trigger 26 has a laterally extending terminal 28, for a purpose which will hereinafter be described.

A pan, designated generally 29, is formed from a single elongated strip of metal 30 and includes a folded and upwardly extending intermediate portion 31. The shaft 14 is disposed between the plies of the intermediate portion 31 which have opposed outwardly bowed parts 32 which straddle said shaft and are turnably mounted thereon for pivotally supporting the pan 29 for rocking movement on the upper shaft 14. The intermediate portion 31 includes spaced apart downwardly divergent lower portions 33 which are spaced from and straddle the lower shaft 13 and the spring 20. The pan 29 includes corresponding end portions 34 and 35 which extend in opposite directions from the lower ends of the portions 33 toward the ends of the base 8 and which are disposed above and spaced slightly from said base. The end portions 34 and 35 each preferably terminates in a flared bifurcated or fork shaped terminal portion 36, as seen in FIGURE 1.

The pan end 35 extends toward the same end of the base 8 as the jaw 16. The strip 30 includes a part extending from the intermediate portion 31 and forming a nose 37 which extends laterally from the intermediate portion 31 and the shaft 14 toward one end of the trap 7, and which is located above the pan end 35. The outer end of the nose 37 has a laterally projecting part forming a detent 38 which is located at approximately the level of the shaft 14, when the pan ends 34 and 35 are disposed substantially parallel to the base 8.

The trap 7 is shown released in FIGURE 1 and in a set position in FIGURES 2 and 3. To set the trap from its released position, the jaws 15 and 16 are swung upwardly and toward one another about the lower shaft 13 for further tensioning the tensioned spiral spring 20. The trigger 26 is swung over the jaw portion 23 and its terminal 28 is positioned to extend laterally toward the nose 37 and to engage the inner side of the detent 38, as best seen in FIGURE 4, to hold the trap in a set position with the pan ends 34 and 35 disposed above and spaced from the base 8 and substantially parallel thereto. The set trap may be positioned in a runway 39, as seen in FIGURE 2, and crosswise thereof, if the width of the runway is greater than the length of the trap, or immediately adjacent an end of the runway, if the trap is longer than the width of said runway. A rodent passing through, entering or leaving the runway 39 must pass over the trap 7 and may pass over either end thereof. The pan ends 34 and 35 extend to adjacent the ends of the base 8 so that a rodent, not shown, in passing over either end of the base 8 will strike or step upon the pan end disposed thereabove to rock the pan 29 about the shaft 14 to swing the nose 37 and detent 38 either upwardly or downwardly. Either upward or downward movement of the detent 38 will disengage it from the trigger terminal 28 to release the trigger 26 and the jaws 15 and 16, so that the jaws will be forcibly swung by the spring 20 downwardly and outwardly of one another to their released positions of FIGURE 1, to trap the rodent between one of the jaws and the end of the base 8 disposed thereneath. The intermediate jaw portions 23 and 24 are disposed slightly beyond the pan terminals 36 in the released positions of the jaws.

The provision of the detent 38 located well above the level of the base 8 enables the use of a shorter trigger 26 which will not strike the animal releasing the trap, which frequently results in malfunctioning of traps having longer triggers.

With the trap 7, it is not necessary for the animal to pass through the jaws. Rather, the animal may pass in either direction over either end of the set trap to effect release of the trap and trapping of the animal. Since the trap is released by an animal attempting to pass over an end thereof, baiting of the trap is not required.

The legs 18 of the jaw 16 will bear against the upper shaft 14, when the trap is set, and the legs 18 of the jaw 15 preferably include bowed portions 40 which also bear against the shaft 14, when the trap is set, to prevent swaying of the jaws while in a set position to insure that any rocking movement of the pan will effect release of the trap.

The strands 17 may have crimped portions 41, as best seen in FIGURE 5, formed in the legs 18 and the portions 23 and 24 and forming teeth 42 which are located on the outer or undersides of the jaws 15 and 16 for more readily holding and killing an animal which is trapped between one of said jaws and the base.

Various modifications and changes are contemplated and may be restorted to, without departing from the function or scope of the invention as hereinafter defined by the appended claims.

We claim as our invention:

1. An animal trap comprising an elongated base, a pair of jaws, means pivotally mounting said jaws about an axis spaced from the ends of the base, located crosswise of the base and disposed thereabove, spring means engaging said jaws and urging the jaws to swing downwardly and outwardly away from one another and against the upper side of the base, a pan having end portions disposed above and adjacent the ends of the base and an upstanding intermediate portion, means engaged by said intermediate portion for supporting and pivotally mounting the pan about an axis disposed substantially above and substantially parallel to the means pivotally mounting said jaws, a trigger member having one end pivotally connected to one of said jaws, said pan having a detent carried by and spaced from the intermediate portion of the pan and engaging the other free end of said trigger for holding the trap set with the jaws in substantially upright positions with said trigger engaging across a part of the other jaw, and said jaws having portions straddling and bearing against the means supporting the pan, in a set position of the trap, to prevent swaying of the jaws.

2. An animal trap comprising an elongated base, a pair of jaws, means pivotally mounting said jaws about an axis spaced from the ends of the base, located crosswise of the base and disposed thereabove, spring means engaging said jaws and urging the jaws to swing downwardly and outwardly away from one another and against the upper side of the base, a pan having end portions disposed above and adjacent the ends of the base and an upstanding intermediate portion, means engaged by said intermediate portion for supporting and pivotally mounting the pan about an axis disposed substantially above and substantially parallel to the means pivotally mounting said jaws, a trigger member having one end pivotally connected to one of said jaws, a nose portion extending from said upstanding intermediate portion in a direction lengthwise of the pan, a detent extending laterally from said nose portion and disposed substantially above the level of the end portions of the pan, and said trigger member having an opposite free end provided with a laterally projecting terminal portion extending in the opposite direction to and engaged by said detent for holding the trap set with the jaws in substantially upright positions and with said trigger member engaging across a part of the other jaw.

References Cited in the file of this patent

UNITED STATES PATENTS

| 383,972 | Mittler | June 5, 1888 |
| 640,244 | Wever | Jan. 2, 1900 |
| 640,980 | Williams | Jan. 9, 1900 |
| 1,499,193 | Plants | June 24, 1924 |

FOREIGN PATENTS

| 319,681 | France | July 29, 1902 |